F. HARDINGE.

WATCHMAN'S CLOCK.

APPLICATION FILED APR. 3, 1914.

Reissued Sept. 19, 1916.

14,193.

Witnesses:
Leonard E. Bogue
Leonard W. Novander.

Inventor
Franklin Hardinge
By Lynn A. Williams
Attorney.

THE NORRIS PETERS CO., PHOTO-LITHO., WASHINGTON, D. C.

UNITED STATES PATENT OFFICE.

FRANKLIN HARDINGE, OF CHICAGO, ILLINOIS, ASSIGNOR TO HARDINGE BROS., OF CHICAGO, ILLINOIS, A CORPORATION OF ILLINOIS.

WATCHMAN'S CLOCK.

14,193. Specification of Reissued Letters Patent. Reissued Sept. 19, 1916.

Original No. 986,630, dated March 14, 1911, Serial No. 526,332, filed November 5, 1909. Application for reissue filed April 3, 1914. Serial No. 829,378.

[DIVISION B.]

*To all whom it may concern:*

Be it known that I, FRANKLIN HARDINGE, a citizen of the United States, residing at Chicago, in the county of Cook and State of Illinois, have invented a certain new and useful Improvement in Watchmen's Clocks, of which the following is a full, clear, concise, and exact description, reference being had to the accompanying drawings, forming a part of this specification.

My invention relates to an improved watchman's clock construction and devices used in connection with same.

My invention relates to that form of watchman's clocks in which a paper record is employed for the purpose of recording the work of a watchman at recurring intervals. The paper is preferably advanced by clockwork and at the intervals mentioned a record is made upon the paper by means of a suitable key. The key employed in this connection consists of two jaw members pivoted to the body of the key and normally held apart so that they may not be brought together, by means of a suitable lock. The jaw members have secured to them, lever members extending to the rear of the pivot of such jaw members and a single spring construction is employed to hold the lock in place and to also move the levers from their position against the record to their open position.

A further essential feature of my invention consists in providing in the casing of the key an alarm mechanism to indicate that the key has been properly operated.

My invention is applicable particularly to that form of watchman's clock adapted to be carried around by the watchman, the keys usable with such clock being secured at the different stations required to be visited by the watchman.

Figure 1:
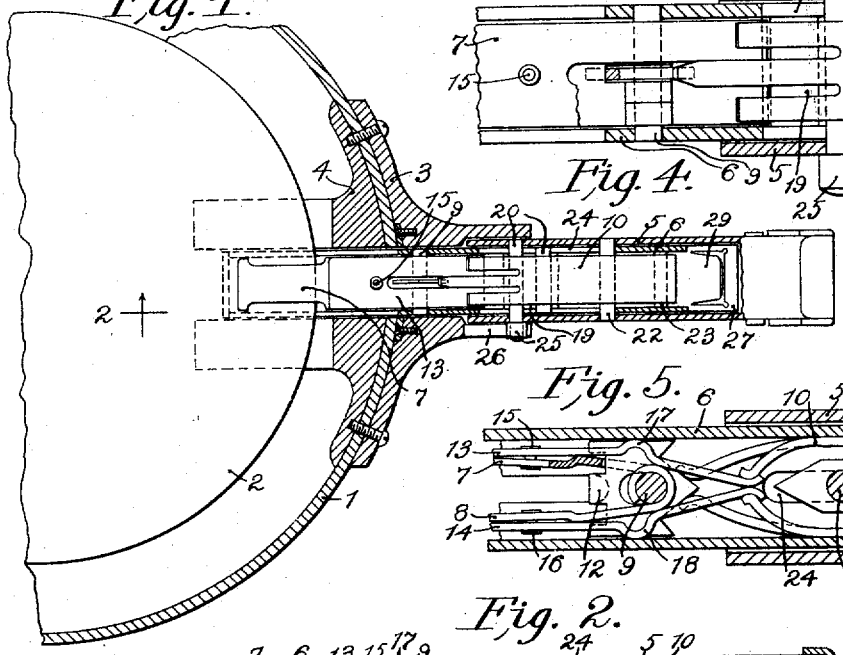
Figure 4:
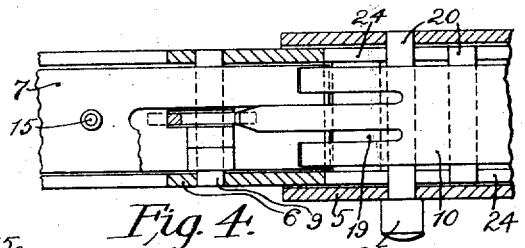
Figure 5:
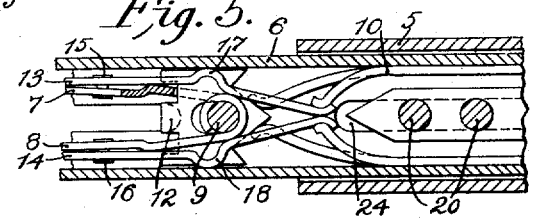
Figure 2:
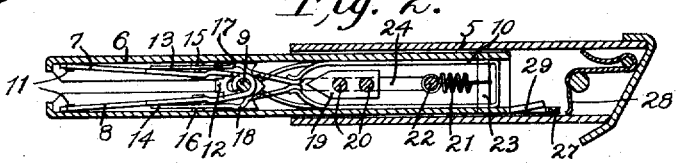
Figure 3:
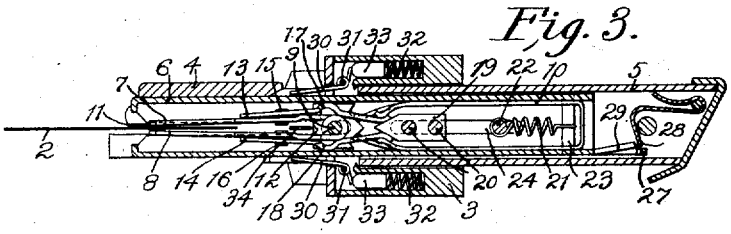
Figure 6:
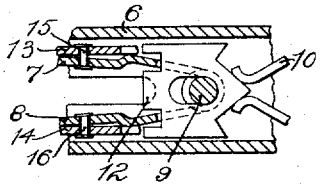

The several drawings illustrating my invention are as follows: Figure 1 is a diagrammatic face view of a portion of the watchman's clock showing in section the key guides employed to receive the watchman's key. In this figure there is also shown a key in place in the clock, the framework of the key being shown in section. Fig. 2 is a sectional view of the key taken along the line 2—2 of Fig. 1. Fig. 3 is a view similar to that shown in Fig. 2 in which the key is in its operative position and is shown in place in the clock mechanism. Fig. 4 is an enlarged view similar to that shown in Fig. 1 of a portion of the key mechanism. Fig. 5 is a sectional view of the parts shown in Fig. 4, taken along the line 2—2, in Fig. 1. Fig. 6 shows an enlarged detail view similar to Fig. 5, of the locking mechanism provided to normally prevent operation of the recording devices carried by the key.

Similar numerals refer to similar parts throughout the several views.

As shown in the drawings, 1 is the clock casing in which 2 is a disk of suitable material, as paper, adapted to receive the impressions made by the watchman's key, and to be suitably driven by means of clockwork contained within the clock case 1. The clock here shown is of a type adapted to be carried around during his work by the watchman. The casing of the clock has secured thereto at 3 an outer key guide, while registering therewith an inner key guide 4 is correspondingly located. The guides 3 and 4 are adapted to receive the casing 5 of the key which in the drawings is shown as a square tube. Within the tube 5, a second tube 6 of similar formation is adapted to slide.

As indicated in Fig. 2, the left hand end of the tube 6 is slotted, and has mounted therein the two jaws 7 and 8 pivoted to the tube 6 at 9, these jaws being normally held apart by the spring 10. The outer ends of the jaws 7 and 8 have formed thereon suitable dies 11 adapted when brought together to form a characteristic impression upon the record disk 2. A lock 12 mounted in the tube 6 so as to slide upon the pivot 9 is provided normally to prevent the jaws 7 and 8 being brought together. The spring 10 is slotted at its left hand end, as indicated in Figs. 1 and 4, so as to engage both the jaws 7 and 8 and the lock 12 in such a manner that either the jaws 7 and 8 or the lock 12 may be moved against the action of the spring as desired without operating those portions of the spring engaging the other members. Levers 13 and 14 are loosely secured to the jaws 7 and 8 by means of rivets 15 and 16 and so conformed as to have fulcrums at 17 and 18 bearing upon the inside of the tube, 6, the right hand end of such levers being extended to the right of the pivot 9 so as to be engaged on their outer surfaces by portions of the spring 10. A cam 19 is supported by the rods 20, 20, from the tube 5 in such a manner that when the tube 6 is moved in the tube 5, the point of the cam enters between the right hand ends of the levers 13 and 14 and thereby moves the left hand end of such levers together, thus bringing the jaws 7 and 8 together if the lock 12 is so moved as to permit this motion. A spring 21 is provided extending between the post 22 carried by the tube 5 and the post 23 carried by the tube 6, the function of this spring being to normally maintain the tube 6 in outer position relatively to the tube 5. The posts 20, 20, and 22 are contained in a slot 24 formed in the side walls of the tube 6, so that such may be moved relatively to the tube 5.

Fig. 6 shows, in a view similar to Fig. 5, the relation of the lock 12 relatively to the inner ends of the jaw members 7 and 8, by which operation of such jaw members is prevented unless the lock is removed from between them. This figure also illustrates the nature of the connection between the jaw members 7 and 8 and the actuating levers 13 and 14, which, as described above, is a loose connection to permit the engagement of the jaw members 7 and 8 at the outer ends of the levers 13 and 14 rather than at the points of connection of such levers to the jaw members.

As shown in Figs. 1 and 4 one of the rods 20 is extended outside of the tube 6 and carries a roller 25 adapted to engage the slot 26 formed in the outer key guide 3. By this means the insertion of the key in any but the right position in the key guide 3 is prevented. One of the walls of the tube 6 is extended as indicated at 27 and adapted to engage a spring 28 carried within the right hand end of the tube 5. The free end of this spring 28, by its engagement with the right hand end of the projection 27, is adapted to be snapped into engagement with the upturned projection 29 on the portion 27 when the tube is moved into the tube 5. The sound produced by the spring striking the projection 29 is an indication to the watchman that the key has been properly operated. Shutters 30, 30, are provided at the inner end of the key guide 3, such shutters being pivoted at 31, 31, and engaged by the plungers 33, 33, as a result of the operation of the springs 32, 32, such shutters serving to close the opening formed in the key guide 3 when the key is withdrawn from such guide.

When the key is inserted in the key guide 3, the jaws 7 and 8 pass one above the other below the disk 2, and the lock 12 comes into engagement with a bar 34 disposed across the outer end of the guide 4, in such a position as to engage the lock and move it to the right against the action of that portion of the spring 10 engaging such lock. With the lock thus out of position it is possible to move the levers 13 and 14 and thus the jaws 7 and 8 by the action of the cam 19 which is pushed between the right hand end of the levers 13 and 14 when the tube 5 is pushed inward against the tube 6. This motion is continued until the spring 28 by slipping from the end 27 of the tube and into engagement with the upturned projection 29 gives an indication that the cam 19 has been moved sufficiently between the right hand ends of the levers 13 and 14 to properly operate the dies 11 to make an impression upon the record 2. As a result of the relation of the levers 13 and 14 to the jaws 7 and 8 it will be observed that the pressure exerted upon the inner end of the levers by the wedge 19 is communicated directly to the left hand ends of the levers 13 and 14 and thus to the jaws 7 and 8 in an effective and efficient manner without undue springing of the parts.

While I have shown my invention in the particular embodiments herein described, I wish to have it understood, however, that similar constructions may be employed without departing from the spirit of my invention.

What I claim as new and desire to secure by Letters Patent of the United States is:

1. As a means for recording a watchman's trips, the combination of a portable clock having a movable record sheet, and a key secured at a desired station and consisting of a casing, two movable members secured to the casing, means carried by such members for making a record on such sheet, a lock for normally preventing such members engaging each other, a spring tending to maintain such lock in its normal position and to maintain such members in their separated position, a stop carried by the clock adapted to engage such lock to move it to release such members so they may make a record on the record sheet, a guideway for such key carried by and projecting from such clock, and shutters in such guideway for closing the same when it is not occupied by the key.

2. As a means for recording a watchman's trips, the combination of a portable clock having a movable record sheet, and a key secured at a desired station and consisting of a casing, two movable members secured to the casing, means carried by such members for making a record on such sheet, a lock for normally preventing such members engaging each other, a spring tending to maintain such lock in its normal position and to maintain such members in their separated position, a stop carried by the clock adapted to engage such lock to move it to release such members so they may make a record on the record sheet, a guideway for such key carried by and projecting from such clock, and shutters in such guideway for closing the same when it is not occupied by the key.

3. As a means for recording a watchman's trips, the combination of a portable clock having a movable record sheet, and a key secured at a desired station and consisting of a casing, two movable members secured to the casing, means carried by such members for making a record on such sheet, a lock for normally preventing such members engaging each other, a spring tending to maintain such lock in its normal position and to maintain such members in their separated position, a stop carried by the clock adapted to engage such lock to move it to release such members so they may make a record on the record sheet, a guideway for such key carried by and projecting from such clock, and means carried by the guideway and key for preventing the improper insertion of the key into the guideway.

4. As a means for recording a watchman's trips, the combination of a portable clock having a movable record sheet, and a key secured at a desired station and consisting of a first tube, jaws pivoted to such tube, means carried by such jaws for making a record, a second tube for slidably containing the first tube, a lock carried by the first tube for normally preventing operation of such jaws, a spring secured to the second tube tending to hold such lock in normal position and to maintain such jaws in separated position, a cam secured to the second tube for moving the jaws together when the two tubes are moved one into the other, a stop carried by the clock adapted to engage such lock to move it to release such members so they may make a record on the record sheet when actuated by such cam, a guideway for such key carried by and projecting from such clock, and shutters in such guideway for closing the same when it is not occupied by the key.

5. As a means for recording a watchman's trips, the combination of a portable clock having a movable record sheet and a key secured at a desired station consisting of a first tube, jaws pivoted to such tube, means carried by such jaws for making a record, a second tube for slidably containing the first tube, a lock carried by the first tube for normally preventing operation of such jaws, a spring secured to the second tube tending to hold such lock in normal position and to maintain such jaws in separated position, a cam secured to the second tube for moving the jaws together when the two tubes are moved one into the other, a stop carried by the clock adapted to engage such lock to move it to release such members so they may make a record on the record sheet when actuated by such cam, a guideway carried by and projecting from such clock, shutters in such guideway for closing the same when it is not occupied by the key, and means carried by the guideway and key for preventing the improper insertion of the key into the guideway.

6. As a means for recording a watchman's trips, the combination of a portable clock having a movable record sheet, and a key secured at a desired station and consisting of a casing, two movable members secured to the casing, means carried by such members for making a record on such sheet, a lock for normally preventing such members engaging each other, a spring tending to maintain such lock in its normal position and to maintain such members in their separated position, and a stop carried by the clock adapted to engage such lock to move it to release such members so they may make a record on the record sheet.

Signed at Chicago, county of Cook and State of Illinois this 1st day of April, 1914.

FRANKLIN HARDINGE.

Witnesses.
A. G. McCaleb,
Mary A. Cook.

Copies of this patent may be obtained for five cents each, by addressing the "Commissioner of Patents, Washington, D. C."